United States Patent [19]
Oppenberg et al.

[11] Patent Number: 5,820,365
[45] Date of Patent: Oct. 13, 1998

[54] CHANNEL BURNER AND METHOD OF HEATING UP A FLOWING GAS

[75] Inventors: Rolf Oppenberg, Wesel; Thomas Lux, Hamminkeln, both of Germany

[73] Assignee: Babcock-Omnical-Industriekessel GmbH, Oberhausen, Germany

[21] Appl. No.: 900,652

[22] Filed: Jul. 25, 1997

[30]     Foreign Application Priority Data

Aug. 16, 1996 [DE]  Germany ..................... 196 33 004.1

[51] Int. Cl.[6] .................................................... F24H 1/00
[52] U.S. Cl. ............................. 432/222; 431/351; 432/29
[58] Field of Search ....................... 432/29, 222; 431/351

[56]         References Cited

U.S. PATENT DOCUMENTS 5,131,836   7/1992   Coppin ..................................... 431/351

*Primary Examiner*—Carroll B. Dority
*Attorney, Agent, or Firm*—Max Fogiel

[57]            ABSTRACT

A channel burner for heating up flowing gas, accommodated inside the channel (1) that conveys the gas and provided with an airbox (2) and a combustion space (3) separated by a burner floor (5). The airbox communicates with an air intake (6) and the burner floor is provided with air-outlet openings in the form of slots (15) in the vicinity of the wall (4) of the combustion space. A gas-supply pipe (7) extends through the airbox and communicates with one or more gas nozzles (12) with bores (13) that open into the combustion space. The outlet cross-section of the slots is beside the bores. The outlet cross-section of the slots is remote from and downstream of the bores in terms of the flowing gas. The slot extends toward the wall of the combustion space. The ratio of the width s of the slot to the width 1 of the combustion space ranges from 0.01:1 to 0.1:1 at the level of the outlet cross-section of the slots.

16 Claims, 5 Drawing Sheets

field leader standards …

CHANNEL BURNER AND METHOD OF HEATING UP A FLOWING GAS

BACKGROUND OF THE INVENTION

The present invention concerns a channel burner and a method of heating up a gas flowing in a channel.

In known channel burners (European Patent 31 206 and European Published Application 352 342) for heating a gas by burning a fuel gas along with air, the air flows in such as to thoroughly combine with the fuel gas. This approach is intended to ensure stable combustion. The thorough combination of the combustion partners, however, also results in a lot of nitrogen oxides in the fuel combustion gas.

SUMMARY OF THE INVENTION

The object of the present invention is a channel burner of the aforesaid genus that will allow stable but low-emission combustion.

Since the combustion air is introduced into the channel burner in accordance with the present invention at a point remote from the central point where the fuel gas is introduced and at angle to its flow, the combustion air generates an inward-directed vortex with a lower air number and with some incompletely burned gas on each side of the rectangular burner. This inward-directed vortex combines with the emerging jets of gas and decreases the combustible components in the fuel gas. The decrease, and the delayed emission of air, prevents the formation of nitrogen oxides. The vortex also ensures stable and complete combustion of the combustible components. To allow formation of the vortex, the air must be injected with a certain force. This force is ensured by injecting the air into the channel burner's combustion space through a especially dimensioned slot.

BRIEF DESCRIPTION OF THE DRAWINGS

Several embodiments of the present invention will now be specified with reference to the accompanying drawing, wherein.

DESCRIPTION OF THE PREFERRED EMBODIMENTS

Figure 1:
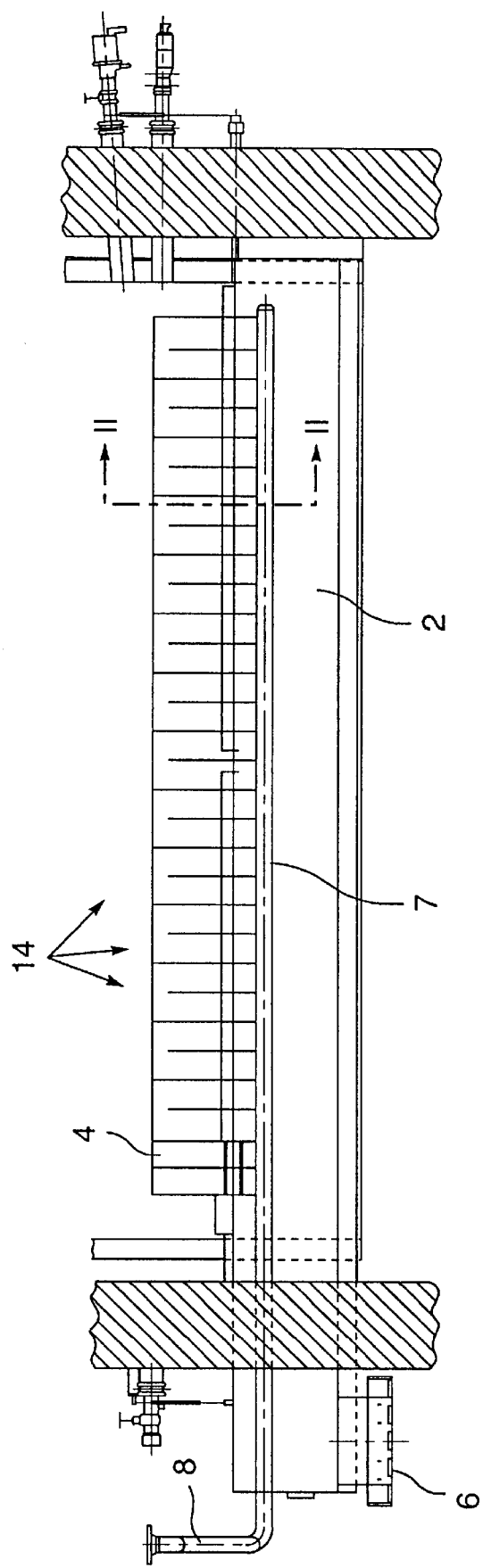
FIG. 1 is a longitudinal section through a flow-conveying channel with a channel burner.

Channel burners are immersed directly into the flow of gas that is to be heated and that flows through a channel 1. They comprise a number of individual burners. The individual burners are combined into what are called rails.

The number of rails built into the channel 1 that the gas being heated flows through depends on how large the channel's cross-section is. The communicating individual burners can be combined horizontally and/or vertically to create a grid-like network wherein the flame can be initially ignited over from a single point with a single pilot burner and a single flame monitor. Mutually separated rails can also be handled in the same way by one pilot burner and one monitor each.

The gas being heated might be exhaust from a gas turbine or stationary internal-combustion engine. The gas might also be flue gas from a gas-purification system that needs to be reheated prior to further processing. It might also be damp air from a drying system that needs to be heat-dried. The gas to be heated can on the whole exhibit the parameters oxygen: 0 to 21% by volume
steam: 0 to 40% by volume
temperature: −50° to +700° C.

When the gas being heated does not include enough oxygen or when the incoming flow is too slow, the air is conveyed to the rail's individual burners through a continuous airbox 2 that is closed off from channel 1. The air is used to burn a fuel gas and simultaneously for a mechanism to be specified hereinafter that generates an inward-directed vortex. The air can also either constitute a portion of the gas being heated that is conveyed through a pressure-increasing blower or be combined with recirculated flue gas or furnace exhaust to further decrease the content of nitrogen oxide.

The channel burner will preferably be rectangular in cross-section and provided with the continuous airbox 2 and with a combustion space 3 that communicates with the airbox. Combustion space 3 is demarcated by walls 4 and separated from continuous airbox 2 by a burner floor 5 that includes air holes, which will be specified hereinafter. Continuous airbox 2 also communicates with an air intake 6 outside channel 1.

Extending through continuous airbox 2 is a gas-supply pipe 7 that communicates with a fuel-gas intake 8 outside channel 1. The fuel gas can be natural gas, coke gas, hydrogen gas, refinery gas, or liquified gas. Inside airbox 2, a series of gas-supply connections 9 communicates with gas-supply pipe 7 at a right angle to its axis. Each gas-supply connection 9 communicates with a gas distributor 10. One or more, two in the present case, gas-outlet pipes 11 extend out of gas distributor 10. Each gas-outlet pipe 11 is provided with gas-outlet openings. The gas-outlet pipes 11 parallel the walls 4 of combustion space 3.

The burner floor 5 of combustion space 3 is fastened gas-tight to the wall of gas-outlet pipes 11 and curves above them preferably in the form of a spherical vault. The gas flowing out of the gas-outlet openings enters the space left between gas-outlet pipes 11 and the vaulted part of burner floor 5. The vaulted part of the floor constitutes a gas nozzle 12. Gas nozzle 12 is provided with bores 13 that open into combustion space 3. The channel burner's continuous combustion space 3 is divided into individual burners 14. A gas-supply connection 9 and its gas-outlet pipes 11 is associated with each individual burner 14.

The air-outlet openings that connect airbox 2 to combustion space 3 are in the form of slots 15 that parallel the walls 4 of combustion space 3. Slots 15 are positioned laterally away from gas nozzles 12 and in the vicinity of walls 4. The open cross-section of slots 15 is positioned in the flow of the fuel gas and downstream of gas nozzles 12. The outer area of the burner floor 5 of combustion space 3 projects for this purpose into combustion space 3 and constitutes a terminal section that, in conjunction with the walls 4, demarcates each slot 15. The air leaving slot 15 flows into the combustion space 3 in the present embodiment along the walls 4.

Figure 3:
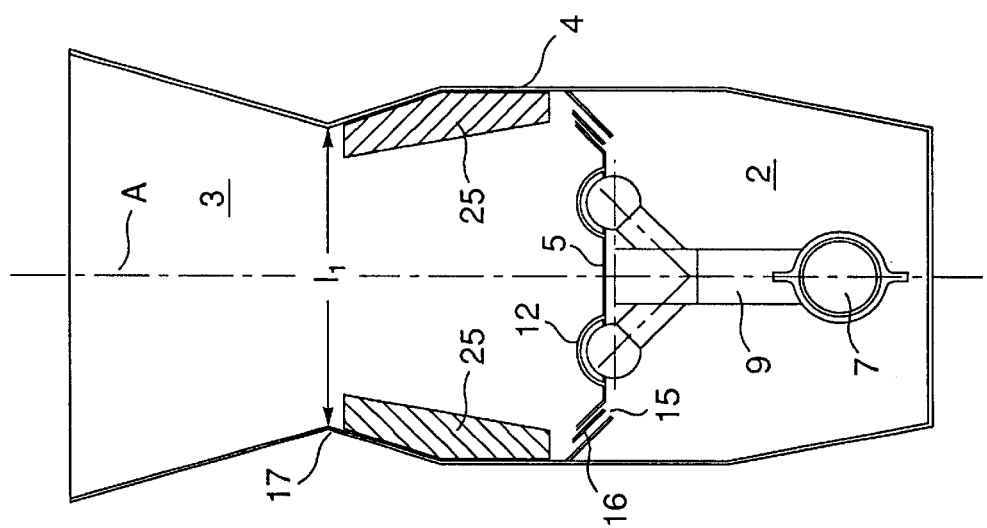

Slots 15 can alternatively be located in the burner floor 5 of combustion space 3. Slots 15 in that event can be directed out into combustion space 3 as illustrated in FIG. 3. Each slot 15 can also, as illustrated in FIG. 3, be divided into two subsidiary slots by a partition 16 that extends laterally along it. There can alternatively be several partitions instead of one. Slots 15 ensure that the emerging air will flow a certain distance in the desired direction.

Figure 2:
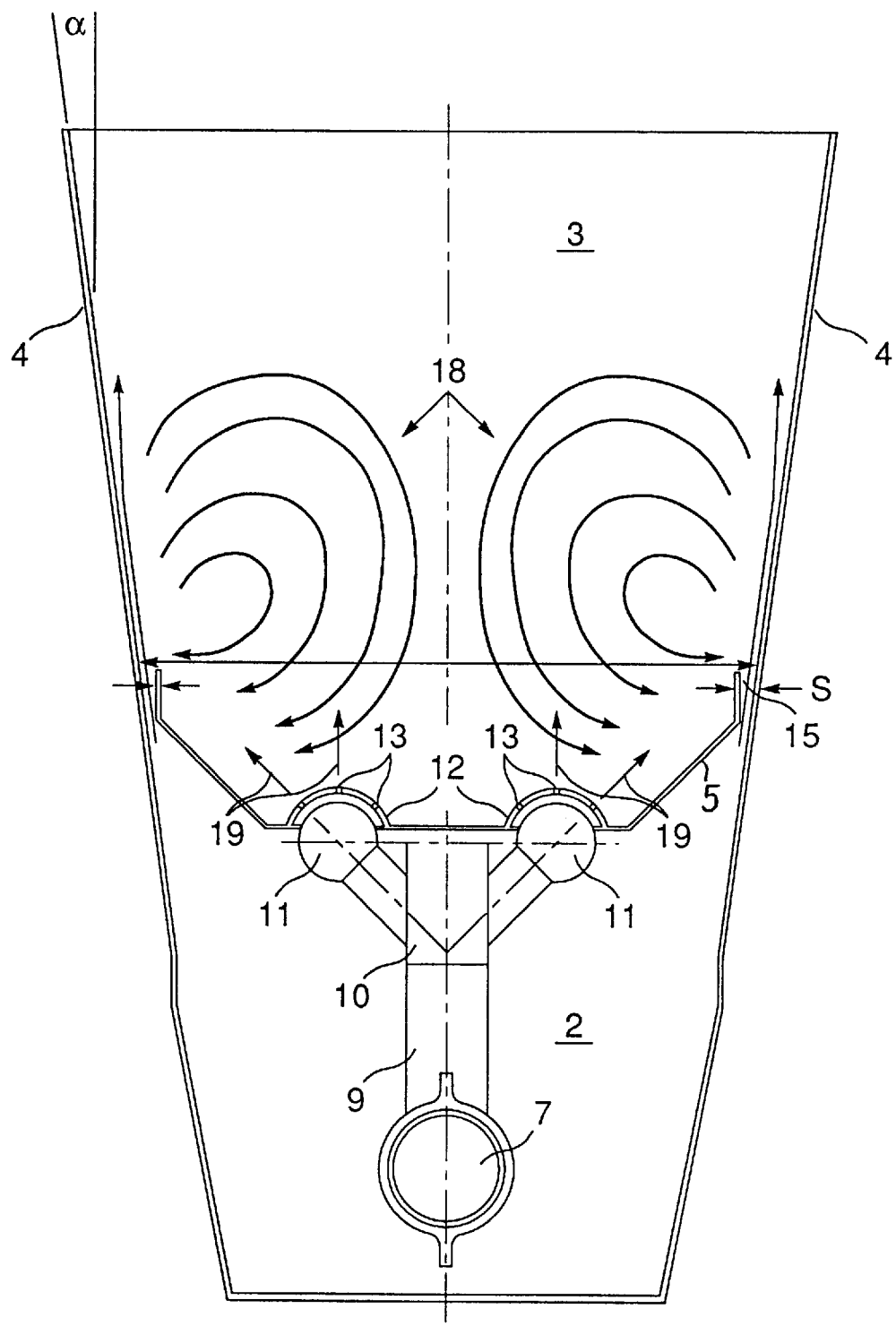
FIG. 2 is an enlarged section along the line II—II in FIG. 1, and FIGS. 3 through 8 are sections along the line II—II illustrating various embodiments of an individual burner in the channel burner.
Figure 7:
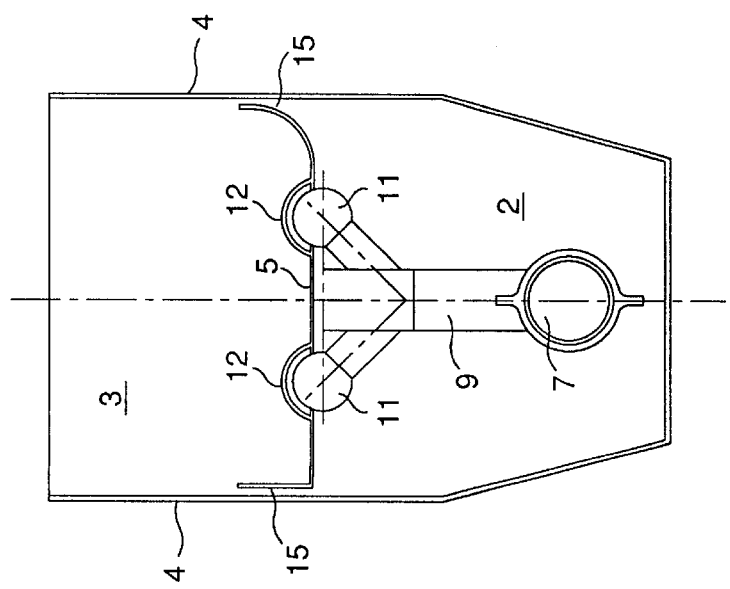

The burner floor 5 of combustion space 3 can, as illustrated in FIG. 7, differ in shape. The part of burner floor 5 that faces the walls 4 of combustion space 3 can either curve convexly toward airbox 2 as illustrated to the right of the burner's longitudinal axis or, as illustrated to the left of that axis, be flat. A flat part can be perpendicular to the longitudinal axis of the burner as illustrated in FIG. 7 or, as illustrated in FIG. 2, aslant.

Figure 6:
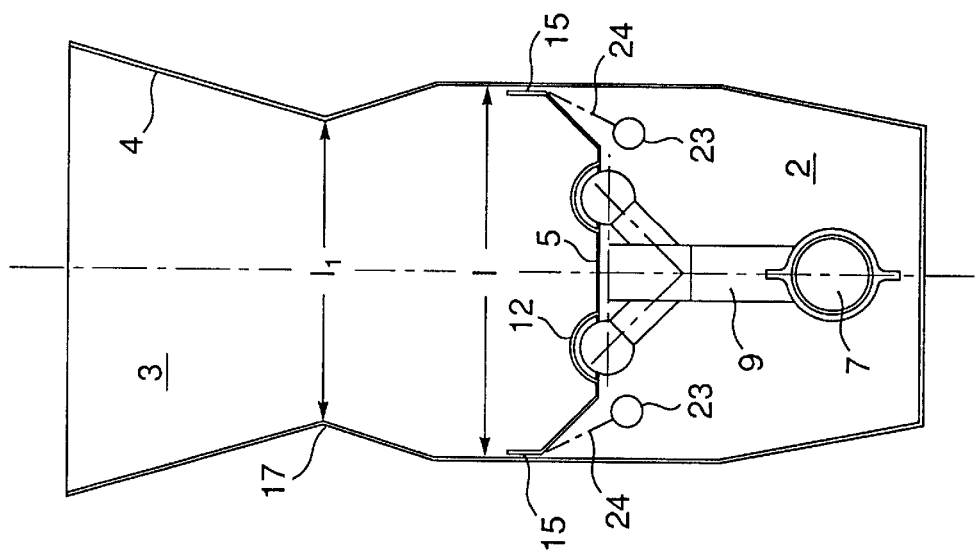
Figure 5:
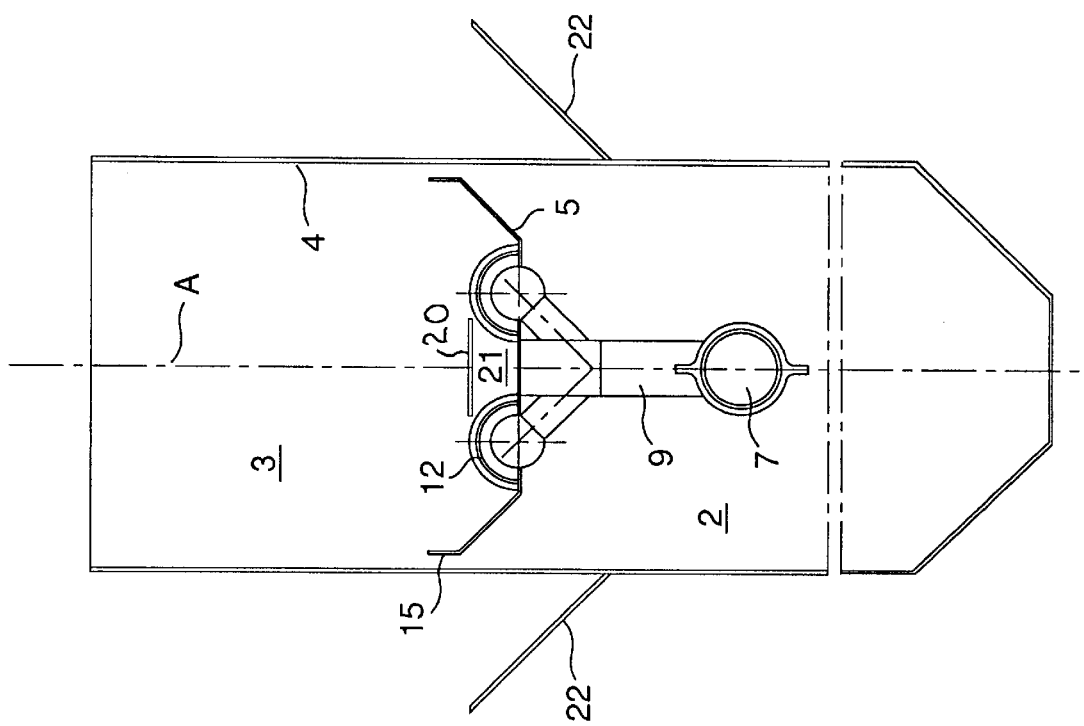
Figure 8:
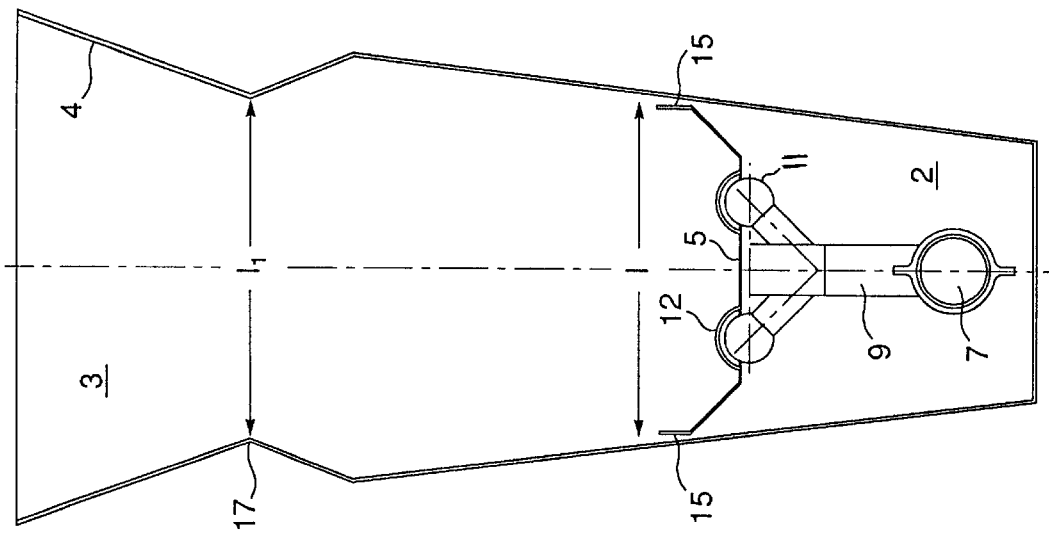

The walls 4 of combustion space 3 can be parallel, resulting in a combustion space 3 that is rectangular in cross-section as illustrated in FIG. 5. Walls 4 can also be positioned at a mutual angle $\alpha$, resulting in a conically expanding combustion space 3 as illustrate in FIG. 2. Angle $\alpha$ can be as wide as 30° and will preferably be 20°. The walls 4 of combustion space 3 can also be provided with a constriction 17. The ratio of the width $1_1$ of airbox 2 at the level of constriction 17 to its width 1 at the level of the outlet cross-section of slots 15 can, as illustrated in FIG. 6, range from 0.6:1 to 0.9:1 if walls 4 are straight and from 0.9:1 to 1.25:1 if the walls spread diffusor-like.

The air leaving slot 15 must be forced into combustion space 3 with a certain amount of force that depends on the burner output and on the ratio of fuel to combustion air. To adjust this force, the ratio of the width s of slot 15 to the width 1 of the combustion space 3 at the level of the slot's outlet cross-section should range from 0.01:1 to 0.1:1.

The air injected through slot 15 next to and downstream of the fuel gas generates an inward-directed vortex 18 on each side of the longitudinal midplane of combustion space 3. The jets 19 of gas leaving nozzles 12 mix with vortex 18. This mixture on the part of the fuel gas decreases the air number of vortex 18 in relation to that of the rest of the entering air. The result is conditions that promote suppression of the formation of nitrogen oxides during combustion. The structure and shape of vortex 18 can be influenced by the slope of the walls 4 of combustion space 3 and the position of constriction 17.

FIG. 5 shows an air-mixing device inside combustion space 3. This air-mixing device comprises a plate 20 positioned between gas nozzles 12 and away from the burner floor 5 of combustion space 3. Between the outer edges of 20 and gas nozzles 12 is a gap that constitutes an air space 21. Air space 21 opens into combustion space 3 and communicates with airbox 2. Some of the fuel gas will accordingly be conveyed directly to the fuel gas, resulting in mixture.

Vanes 22 in the form of intact or perforated sheets of metal are mounted on the outside of the airbox 2 illustrated in FIG. 5 at an angle along the direction of the gas flowing into channel 1. Vanes 22 can alternatively be mounted on the walls 4 of combustion space 3. The vanes can be individually adjusted from outside to vary the free cross-section between several channel burners or between one channel burner and the wall of the channel. The vanes can be pivoted 0° to 180°.

Steam can be injected by known procedures to further decrease the formation of nitrogen oxides. The steam is sprayed into the combustion air just before the air enters slot 15. This is done with the channel burner specified herein with steam pipes 23 that open into airbox 2 as illustrated in FIG. 6. Steam pipes 23 are provided with outlet nozzles, the axes 24 of which are oriented toward the intake into slot 15.

Figure 4:
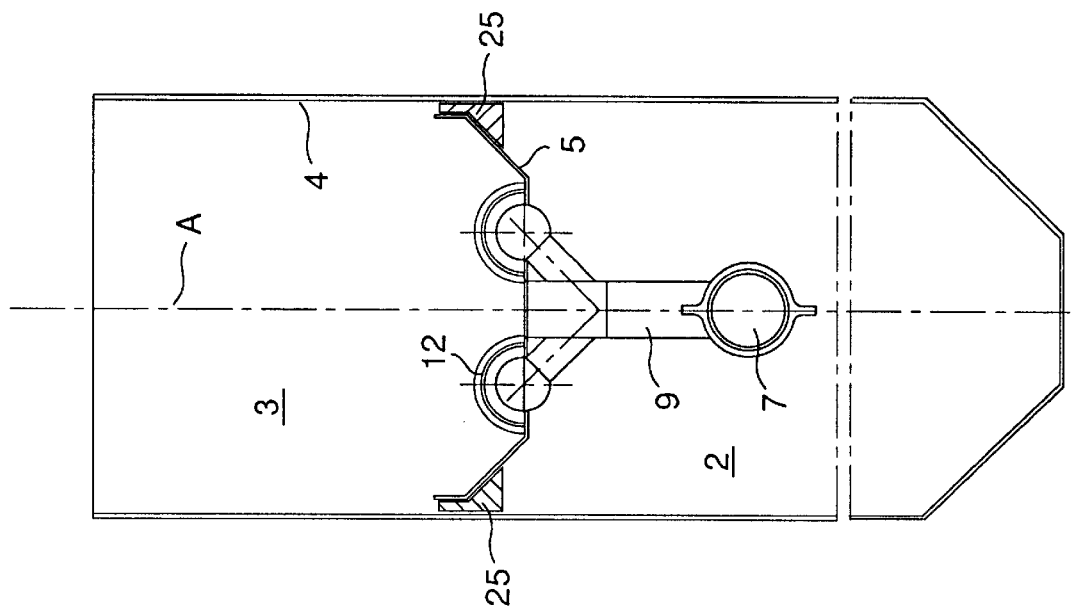

FIG. 4 illustrates a series of preferably flat sheets 25 of metal positioned laterally separated in slot 15. Sheets 25 extend through slot 15 at an angle to its length and along the longitudinal axis A of the burner. Sheets 25 act like rectifiers and divert the air leaving airbox 2 and entering slot 15 in a perpendicular direction. The air is accordingly uniformly distributed to every individual burner 14 illustrated in FIG. 1. If the slot 15 is, as illustrated in FIG. 3, divided by a partition 16 into two parallel subsidiary slots, adding the rectifying sheets 25 above the outlet cross-section of the slot near the walls of combustion space 3 is to be recommended.

We claim:

1. A channel burner for heating up flowing gas inside a channel conveying the gas and having an airbox and a combustion space; a burner floor separating said combustion space; an air intake communicating with said airbox; said burner floor having means forming air outlet openings in the form of slots for directing air along an inner surface of walls of said combustion space; a gas-supply pipe extending through said airbox and communicating with at least one gas nozzle having bores opening into said combustion space; said slots having outlets located laterally of and downstream of said bores with respect to the flowing gas, said slots having a width and said combustion space having a width, the ratio of said width of said slots to said width of said combustion space ranging from 0.01:1 to 0.1:1 at a level of an outlet cross-section of said slots.

2. A channel burner as defined in claim 1, wherein said combustion space has walls sloping out conically in direction of flow.

3. A channel burner as defined in claim 1, wherein said combustion space has parallel walls.

4. A channel burner as defined in claim 1, wherein said combustion space has walls with a constriction having a level, said combustion space having a width at said level of said constriction, the ratio of the width of said combustion space at said level of said constriction to the width of said combustion space at said level of the outlet cross-section of a slot ranging from 0.6:1 to 0.9:1 when walls of said combustion space are parallel and from 0.9:1 to 1.25:1 when said walls spread diffusor-like.

5. A channel burner as defined in claim 1, wherein said combustion space has walls, each of said slots having an outside demarcated by one of said walls of said combustion space.

6. A channel burner as defined in claim 1, wherein said slots are in said burner floor.

7. A channel burner as defined in claim 1, wherein said slots extend out in a direction onto said wall of said combustion space.

8. A channel burner as defined in claim 1, wherein said slots have a length and said burner has a longitudinal axis; sheets of metal positioned in said slots at an angle to said length of said slots and extending in a direction of said longitudinal axis.

9. A channel burner as defined in claim 1, wherein said combustion space has a wall and said burner has a longitudinal axis; sheets of metal positioned in vicinity of said wall above said outlet cross-section of said slots and extending toward said longitudinal axis of said burner and at an angle to said wall.

10. A channel burner as defined in claim 1, including at least one partition extending along said slots and dividing said slots into a plurality of parallel subsidiary slots.

11. A channel burner as defined in claim 1, including a plate for leaving an air space at a distance above said burner floor and a gap remote from each of said gas nozzles said air space communicating with said airbox.

12. A channel burner as defined in claim 1, wherein said burner floor has a vaulted part adjacent said walls of said combustion space.

13. A channel burner as defined in claim 1, wherein said burner has a longitudinal axis; said burner floor having a flat part adjacent said walls of said combustion space and extending aslant or perpendicular to said longitudinal axis of said burner.

14. A channel burner as defined in claim 1, including vanes adjustable from outside and attached to the outside of said airbox or said walls of said combustion space at an angle to the flow of gas being heated.

15. A channel burner as defined in claim 1, including steam-conveying pipes in said airbox and having outlet bores with axes oriented toward an intake cross-section of said slots.

16. A method of heating up a gas flowing inside a channel comprising the steps of providing a channel burner as defined in claim 1, introducing air needed to burn the gas at a point remote from a point where the gas is introduced along and at an angle to the flow of the gas, such as to flow along a wall of said combustion chamber and generate an inward-directed vortex with a lower air number that combines with the emerging gas.

* * * * *